(12) United States Patent
Jayasuriya

(10) Patent No.: US 7,862,083 B2
(45) Date of Patent: Jan. 4, 2011

(54) ACTUATION MECHANISM FOR THE DEPLOYMENT OF A LATERALLY EXTENDABLE RUNNING BOARD TO PROVIDE ROLLOVER RESISTANCE

(75) Inventor: A. Mangala M. Jayasuriya, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1071 days.

(21) Appl. No.: 11/606,251

(22) Filed: Nov. 29, 2006

(65) Prior Publication Data

US 2008/0122209 A1  May 29, 2008

(51) Int. Cl.
    *B62D 49/08*  (2006.01)
(52) U.S. Cl. .................... 280/755; 280/756; 280/763.1; 280/764.1; 280/765.1; 280/766.1; 180/282
(58) Field of Classification Search ................. 280/755, 280/756, 763.1, 764.1, 765.1, 766.1, 164.1; 180/282
    See application file for complete search history.

(56) References Cited

U.S. PATENT DOCUMENTS

| 1,231,531 A | 6/1917 | Shilling ....................... 293/114 |
| 1,932,031 A | 10/1933 | Bellantese ................... 280/755 |
| 5,684,456 A | 11/1997 | Walter ......................... 340/440 |
| 5,744,872 A | 4/1998 | Cario ........................ 307/10.1 |
| 5,931,499 A * | 8/1999 | Sutherland .................. 280/755 |
| 6,202,488 B1 | 3/2001 | Cash ........................ 73/514.26 |
| 6,299,093 B1 * | 10/2001 | Harte et al. .............. 242/384.4 |
| 6,302,489 B1 * | 10/2001 | Coppo ........................ 297/478 |
| 6,588,799 B1 * | 7/2003 | Sanchez ..................... 280/755 |
| 6,957,790 B2 * | 10/2005 | Kielwein et al. ......... 242/384.6 |
| 7,673,902 B2 * | 3/2010 | Jayasuriya et al. .......... 280/755 |
| 7,731,118 B2 * | 6/2010 | Ruff et al. ................ 242/382.2 |
| 2008/0122209 A1 * | 5/2008 | Jayasuriya .................. 280/755 |

\* cited by examiner

*Primary Examiner*—Thomas G Black
*Assistant Examiner*—Wae Louie
(74) *Attorney, Agent, or Firm*—Frederick Owens, Esq.; Miller Law Group, PLLC

(57) ABSTRACT

An actuation mechanism is used with the deployment apparatus mounting a running board on an automotive vehicle for laterally outward movement to increase rollover resistance for the vehicle. The actuation mechanism includes a cup with a hollow tube attached thereto to provide a path for the movement of a ball from the cup into engagement with the latching mechanism on the deployment apparatus. The ball is retained within the cup member until the actuation mechanism and the automotive vehicle to which it is mounted tilts to a minimum roll angle, whereupon the ball is released to roll down the hollow tube into engagement with the latching mechanism of the deployment apparatus. In one embodiment, a single cup with a pair of laterally extending tubes directs the ball to the deployment apparatus that requires actuation. In other embodiments, a separate actuation mechanism is provided for each respective deployment apparatus.

20 Claims, 10 Drawing Sheets

Fig. 6
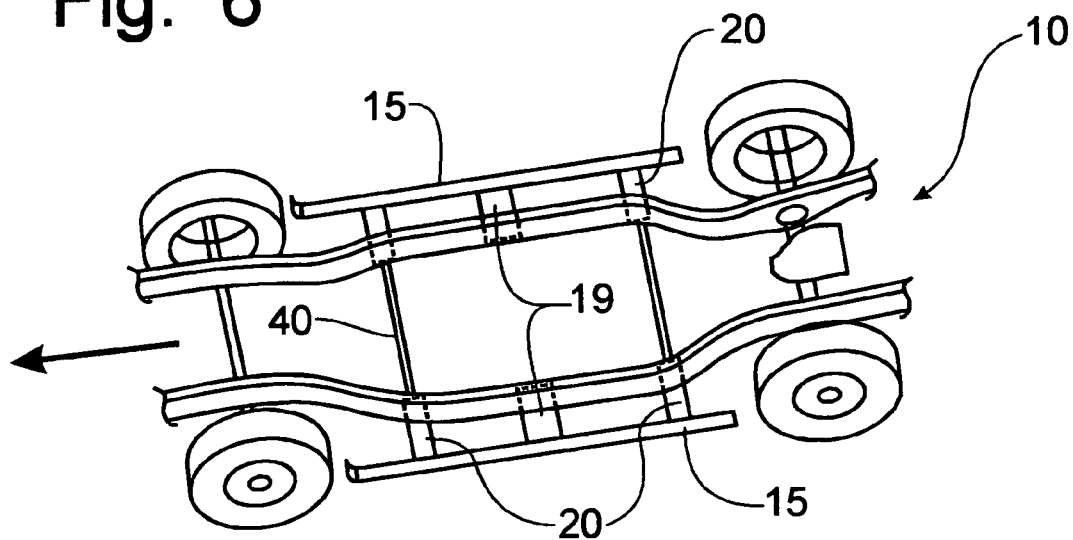
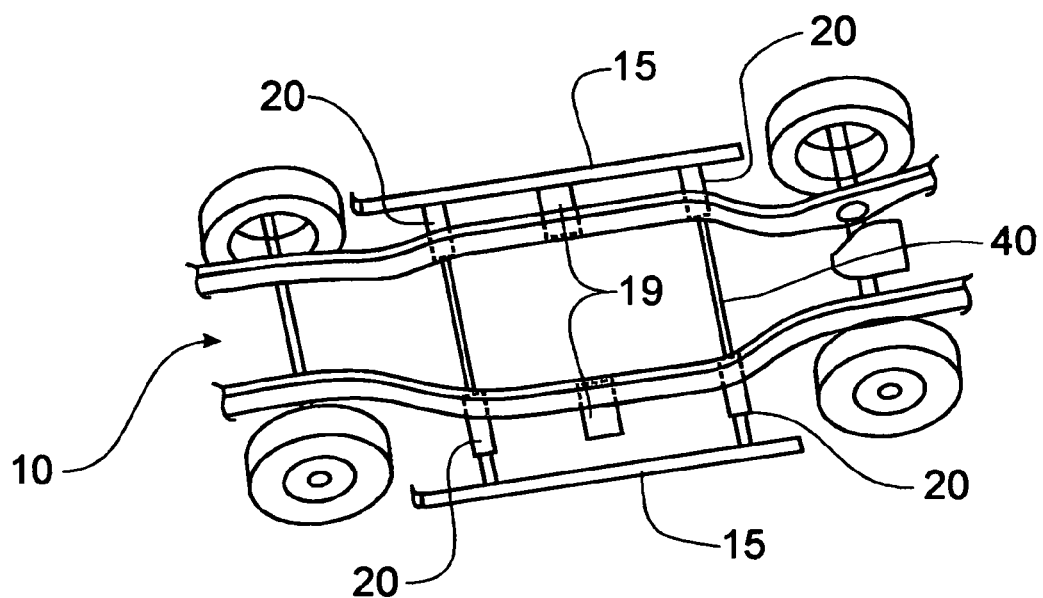
Fig. 7

Fig. 12
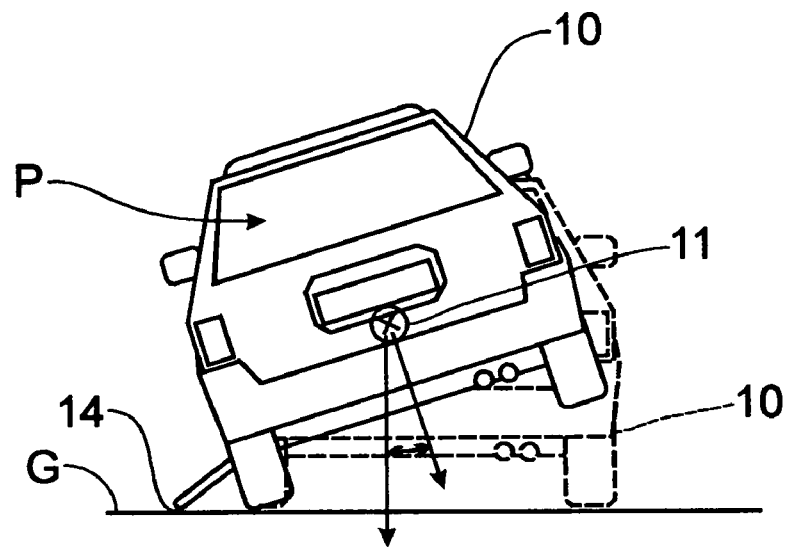
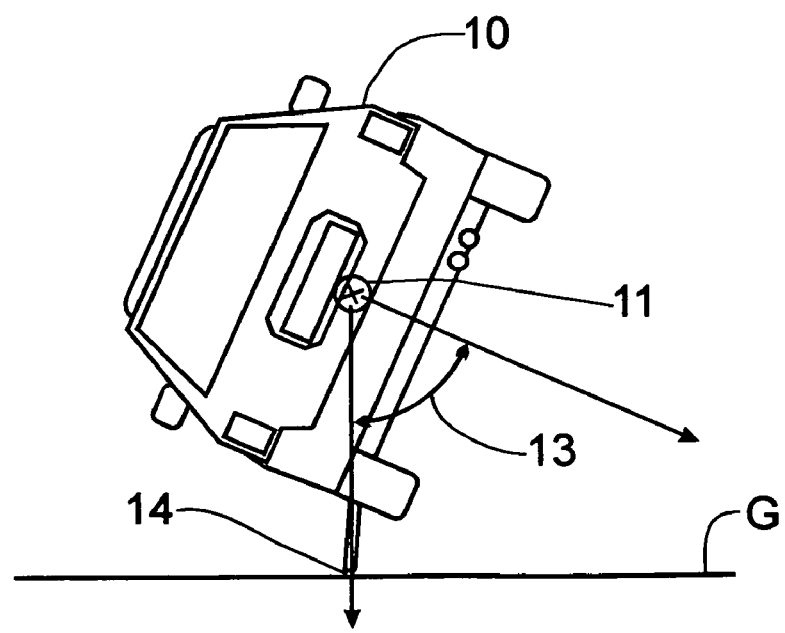
Fig. 13

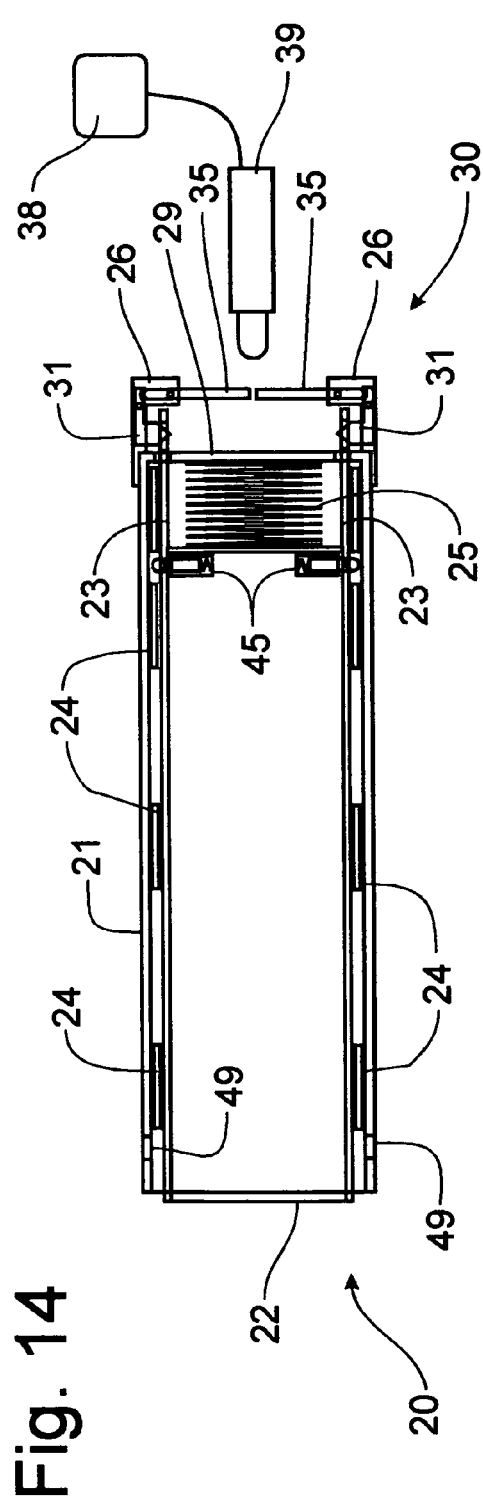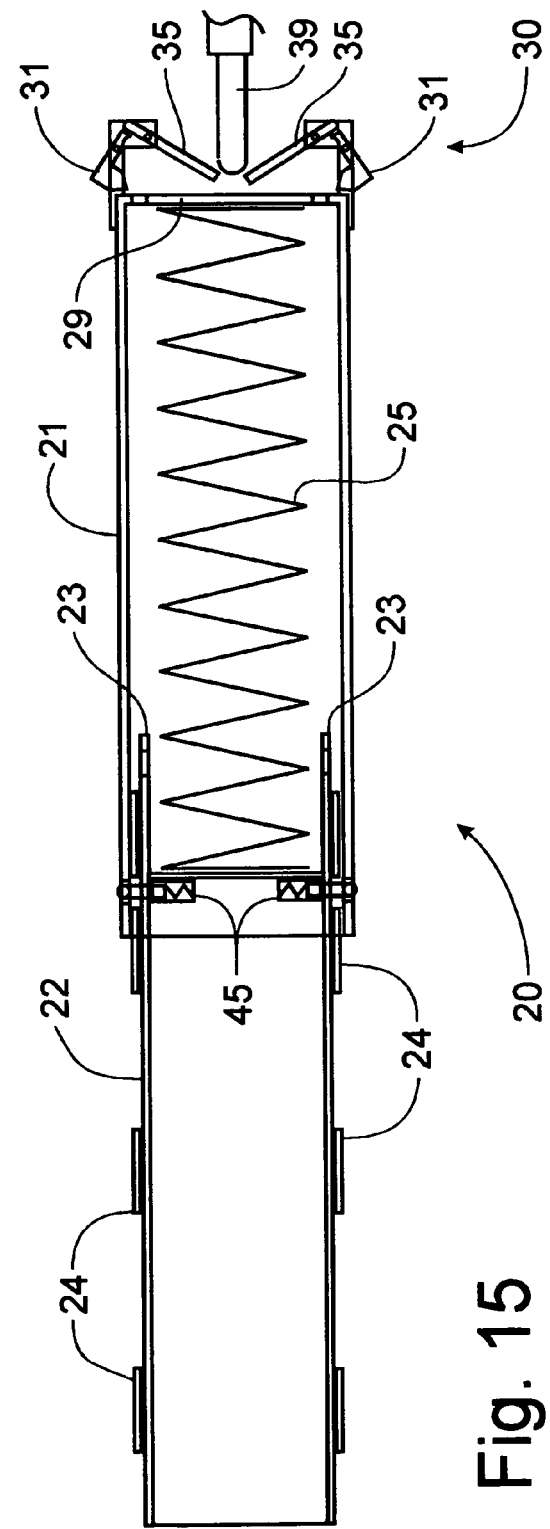

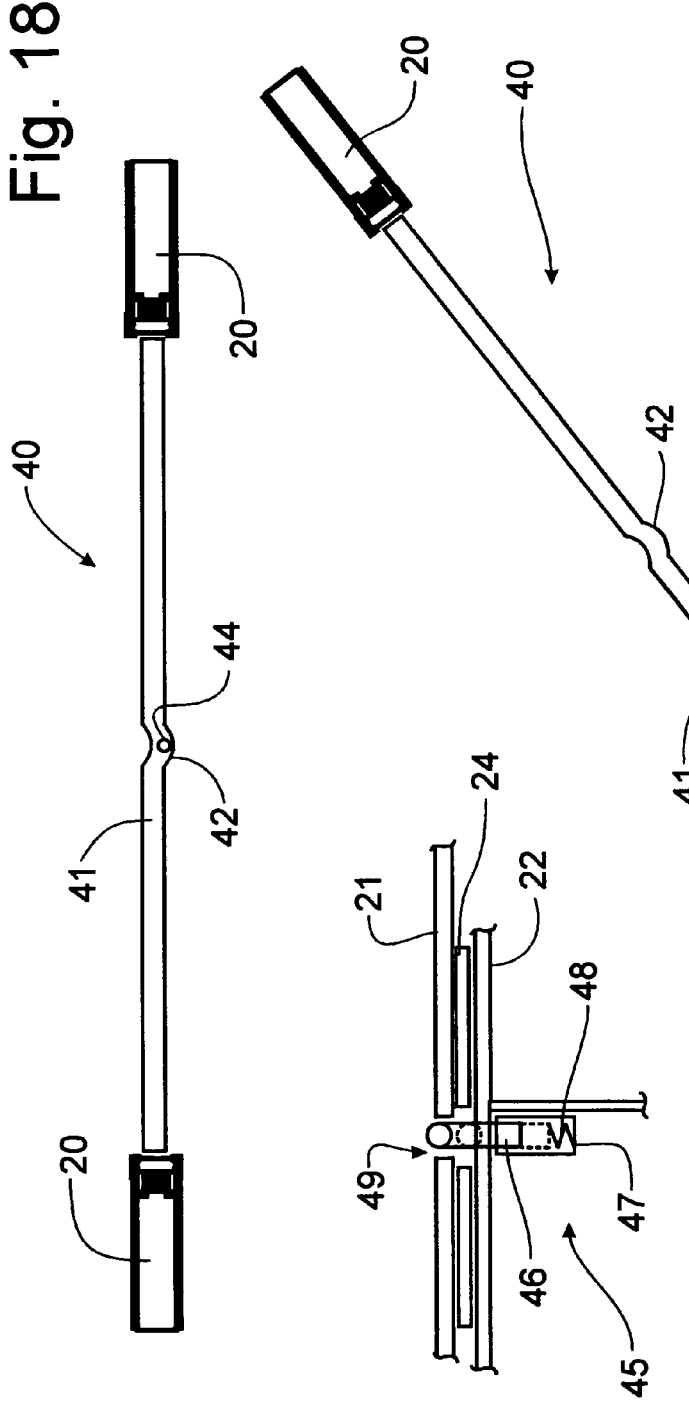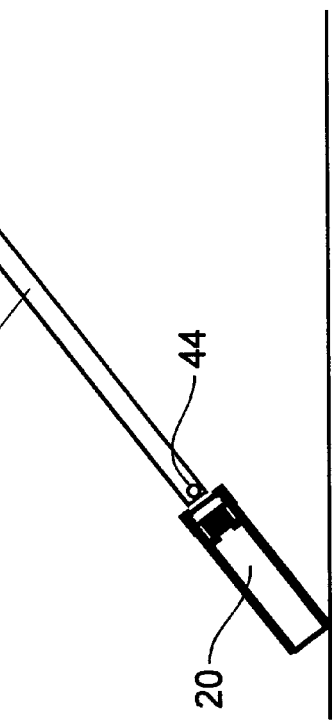

ACTUATION MECHANISM FOR THE DEPLOYMENT OF A LATERALLY EXTENDABLE RUNNING BOARD TO PROVIDE ROLLOVER RESISTANCE

FIELD OF THE INVENTION

This invention relates generally to an extendable running board for use on an automotive vehicle and, more particularly, to a running board that is mounted for outward projection in the event of a rollover of the vehicle to increase rollover resistance by increasing the tipped-over angle at the unstable equilibrium.

BACKGROUND OF THE INVENTION

Running boards are available on many automotive vehicles, such as pick-up trucks, and sport utility vehicles, to provide an easy ingress and egress to the vehicles. In some vehicles the running boards are fixed to the frame of the vehicle and are not intended to move in any direction. In other vehicles, the running board is movably mounted for selective positioning for the convenience of the user of the running board. For example a powered movement of the running boards is disclosed in U.S. Pat. No. 6,325,397, issued to David M. Pascoe, et al on Dec. 4, 2001. In this Pascoe patent, the running board is mounted on parallel linkages, which are coupled to an electric motor to effect a powered pivotal movement of the running board between a stored position and a deployed position. Other movable running boards are mechanically moved, such as is disclosed in U.S. Pat. No. 5,697,626, issued to Patrick K. McDonald, et al on Dec. 16, 1997, in which the running board is pivotally supported on the frame of the vehicle and vertically movable by a bell crank that pivotally moves the step portion of the running board. Such movable running boards are utilized solely for the purpose of providing convenient access between the ground and the passenger compartment of the vehicle.

The static stability factor (SSF) of a vehicle is a parameter used by the NHTSA to determine the rollover propensity of an automotive vehicle. A typical passenger car exhibits an SSF in the range of 1.3 to 1.5 while larger vehicles, such as the SUV's may have an SSF value in the range of 1.0 to 1.3, due primarily to the higher location of the center of gravity. The SSF factor is calculated as half the track width divided by the height to the center of gravity of the vehicle. The static stability factor also reflects the tilt table ratio and the centrifugal acceleration per gravity of the vehicle required to pass the point of unstable static equilibrium. Therefore, an increase in the SSF would indicate an increase in the roll angle at which the vehicle would become unstable and roll over to the side of the vehicle. If the effects of the suspension of the vehicle were ignored, passenger cars can be rolled statically to an angle of typically up to 52.4 to 56.3 degrees, or be subject to static lateral accelerations up to 1.3 to 1.5 times the force of gravity before experiencing a rollover event. Pick-up trucks and SUV's have a higher center of gravity resulting in a roll angle of typically about 45 to 52.4 degrees before experiencing a rollover event. When a vehicle is swerved onto gravel or earth during a potential rollover event, an increase in the resistance to the vehicle's speed, roll, yawing and sliding would shorten the time needed to bring the vehicle under control and stability.

In U.S. Pat. No. 1,231,531 granted on Jun. 26, 1917, to E. C. Shilling an automotive vehicle is equipped with a tilt prevention apparatus that is manually operated by pulling a lever to activate the device carried on the front and rear bumpers of the vehicle. The framework slides by gravity to the left or to the right of the vehicle to engage the ground in the event the vehicle goes into a ditch or the like. Similarly, U.S. Pat. No. 1,932,031, issued to S. Bellantese on Oct. 24, 1933, the vehicle carries a laterally shiftable apparatus that is mounted to the frame under the vehicle. The apparatus is activated directly by centrifugal force exerted while driving on a curve, which overcomes a set of springs retaining the apparatus in a central position.

In U.S. Pat. No. 5,931,499, granted on Aug. 3, 1999, to D. R. Sutherland, two pyrotechnically activated roll protection devices are disclosed. In one embodiment, laterally extending stabilizer beams are activated by a cylinder/piston with a pyrotechnic charge encased inside the wheel axle shafts. The second embodiment utilizes two pivoted beams attached to the vehicle body frame on each side to rotate about their vertical axes to attain laterally extending positions to prevent roll. Utilizing pyrotechnic charges is a costly design and packaging the cylinder/piston mechanism with squibs would be a significant challenge. Several embodiments of a rollover prevention device for trucks are disclosed in U.S. Pat. No. 6,588,799, granted to A. Sanchez on Jul. 8, 2003. In one embodiment, a laterally extendable arm slides by gravity until the ball on the end of the arm contacts the ground. In another embodiment, a vertically attached gear arm is pivoted at the top to a hollow arm. When the vehicle starts to roll, the hollow arm swings while engaging the gears and gets locked to prevent the vehicle from rolling. In still another embodiment, a sensor activates a vertically mounted piston mechanism that is fixed to the suspension system. The upper and lower pistons are driven by compressed air when roll is sensed to drive the lower piston to engage the ground and the upper piston to push the vehicle body back to a level position.

An inertia-based sensor is disclosed in U.S. Pat. No. 5,684,456, granted to Joachim Walter on Nov. 4, 1997, in which a cube-shaped weight is balanced by flexible arms and two extension measurement elements. The measuring element produces an electrical quantity such as a change in resistance or voltage. An electrical circuit would then be able to detect the roll and activate a remote device to prevent the roll. In U.S. Pat. No. 6,202,488, issued on Mar. 20, 2001, to S. M. Cash, an optical sensor based on inertia is disclosed. Such a sensor could be connected to an electronic control module to activate safety devices such as seatbelts, air bags in the event of a rollover, which is defined as being when the vehicle has rolled more than 75 degrees. Another inertia-based sensor is disclosed in U.S. Pat. No. 5,744,872, granted on Apr. 28, 1998, to Gasper Cairo in which a steel ball is mounted in a cup to generate an electrical signal in conjunction with an opaque projector associated with the movement of the ball.

Actuation of a deployable running board would require the sensing of a rollover event following by a rapid deployment of the running board at the lower side of the vehicle from a retracted position to an extended position so that the running board can engage the surface of the ground outboard of the adjacent vehicle tire to resist the continued rolling of the vehicle. Such a sensing and actuation device could be electronic in nature, and such sensing and actuation technology exists; however, a mechanical actuation mechanism would provide cost saving opportunities, as compared to the utilization of electronics, and provide a device that is not dependent on electrical energy being present at the time of the rollover event.

It would be desirable to provide an actuation mechanism that is operable to affect deployment of a laterally extendable running board on an automotive vehicle in response to the beginning of a rollover event for the vehicle.

SUMMARY OF THE INVENTION

It is an object of this invention to overcome the aforementioned disadvantages of the known prior art by providing a mechanical actuation mechanism for a deployable running board that can be positioned to increase the resistance of an automotive vehicle to a rollover.

It is another object of this invention to provide a mechanically actuated, spring-loaded deployment apparatus for laterally moving a running board mounted on a vehicle into a ground-engaging position to increase the resistance of the vehicle to rollover.

It is a feature of this invention to provide an extendable running board apparatus that can be positioned for engagement with the ground as the vehicle starts to roll over to increase the roll angle at which the vehicle becomes unstable.

It is an advantage of this invention that the extension of the running board laterally from the vehicle provides a pivot point for the vehicle during a rollover event that increases the angle at which the vehicle rolls over.

It is another advantage of this invention that the effective static stability factor of a vehicle in increased by the lateral extension of the running board.

It is still another object of this invention to provide a deployable structure that can engage the ground in the early stages of a rollover event to provide resistance to the motion of the vehicle, including forward motion.

It is still another advantage of this invention that the deployment of the running board to engage the surface of the ground will help stabilize the vehicle before becoming unstable during a rollover event.

It is yet another advantage of this invention that the running board deployment apparatus can be re-set to re-position the vehicle running boards to their normal position after being extended laterally to increase rollover resistance for the vehicle, in the case when the rollover was prevented and the parts were not damaged.

It is still another feature of this invention that deployment apparatus can be positioned to extend the running board horizontally or angularly toward the ground, while still be capable of mechanical actuation.

It is a further advantage of this invention that the telescopic piston is latched into a retracted position corresponding to the normal position of the running board which is connected to the telescopic piston.

It is yet a further feature of this invention that the deployment apparatus can be activated by a mechanical apparatus that releases a ball into engagement with the latching mechanism of the deployment apparatus when the vehicle tilts to a predetermined minimum roll angle.

It is another feature of this invention that the actuation mechanism includes a cup member that retains the ball until the actuation mechanism and the vehicle to which the actuation mechanism is attached is tilted to a predetermined minimum roll angle.

It is still another feature of this invention that the actuation mechanism can be configured to provide a ball for engagement of each respective deployment apparatus mounting the running board for lateral movement.

It is a further object of this invention to provide a mechanical actuation mechanism for use with a deployment apparatus for extending a laterally movable running board, which is durable in construction, inexpensive of manufacture, carefree of maintenance, facile in assemblage, and simple and effective in use.

These and other objects, features and advantages are accomplished according to the instant invention by providing an actuation mechanism for use with the deployment apparatus mounting a running board on an automotive vehicle for laterally outward movement to increase rollover resistance for the vehicle. The actuation mechanism includes a cup with a hollow tube attached thereto to provide a path for the movement of a ball from the cup into engagement with the latching mechanism on the deployment apparatus. The ball is retained within the cup member until the actuation mechanism and the automotive vehicle to which it is mounted tilts to a minimum roll angle, whereupon the ball is released to roll down the hollow tube into engagement with the latching mechanism of the deployment apparatus. In one embodiment, a single cup with a pair of laterally extending tubes directs the ball to the deployment apparatus that requires actuation. In other embodiments, a separate actuation mechanism is provided for each respective deployment apparatus.

BRIEF DESCRIPTION OF THE DRAWINGS

The advantages of this invention will become apparent upon consideration of the following detailed disclosure of the invention, especially when taken in conjunction with the accompanying drawings wherein:

FIG. 6 is a schematic perspective view of the vehicle frame similar to that of FIG. 3, but depicted a third running board embodiment;

FIG. 7 is a schematic perspective view of the vehicle frame of FIG. 6 showing the left running board being laterally extended;

FIG. 12 is a diagrammatic rear elevational view of a vehicle having a second embodiment of the deployable running board depicted in the laterally extended position where the running board engages the ground;

FIG. 13 is a diagrammatic rear elevational view of the vehicle depicted in FIG. 12 but showing the maximum roll angle before the vehicle becomes unstable and rolls over;

FIG. 14 is a cross-sectional view through the deployment apparatus attached to the extendable running board, the piston being depicted in the retracted position compressing the spring between the piston and the cylinder slidably housing the piston, the latching mechanism being depicted in the latched position;

FIG. 15 is a cross-sectional view of the deployment apparatus similar to that of FIG. 14 but showing the piston telescopically extended to affect a lateral movement of the attached running board, the latching mechanism being depicted in the release position;

FIG. 18 is a cross-sectional view of a mechanical actuation mechanism associated with the deployment apparatus, the actuation mechanism being shown in a neutral position;

FIG. 19 is a cross-sectional view of the actuation mechanism shown in FIG. 16 but tilted into an activating position;

FIG. 20 is an enlarged detail view of a portion of the stop mechanism carried by the activation member to prevent separation of the activation member from the base member;

DETAILED DESCRIPTION OF THE PREFERRED EMBODIMENT

Referring to FIGS. 1-7, an automotive vehicle utilizing a laterally extendable running board apparatus incorporating the principles of the instant invention can best be seen. The vehicle 10 is depicted as a sport utility vehicle; however, one of ordinary skill in the art will readily recognize that any vehicle 10 on which a running board can be mounted can utilize the instant invention, including sport utility vehicles, pick-up trucks, vans, mini-vans, and the like. Any left and right references used within this description are used as a matter of convenience and are determined by standing at the rear of the vehicle and facing the forward direction. The principles of the instant invention are applicable to many different types or configurations of running boards, three of which are depicted in a representative manner in FIGS. 1-7.

Figure 8:
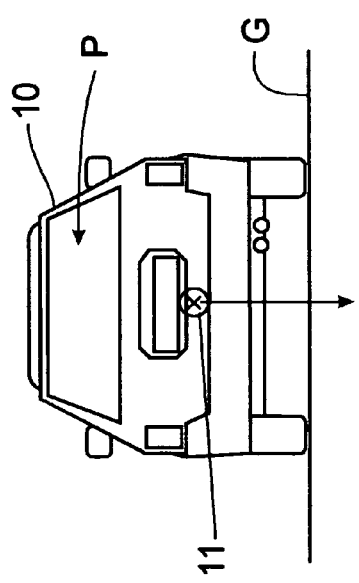
FIG. 8 is a diagrammatic rear elevational view of an automotive vehicle, the center of gravity being depicted by the circled "X"
Figure 9:
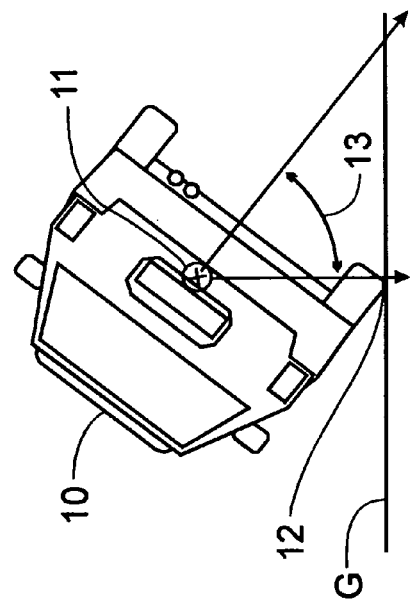
FIG. 9 is a diagrammatic rear elevational view of the prior art vehicle showing the maximum roll angle before the vehicle becomes unstable and rolls over on its side.

The running board 15 is supported from the frame 12 of the vehicle 10 and is typically positioned on both the left and right sides of the vehicle 10 to provide assistance for the ingress and egress of the passenger compartment P of the vehicle 10. The principle of the instant invention is to cause a deployment of the running board 15 laterally outwardly relative to the vehicle 10 to change the pivot point about which the vehicle 10 turns during a rollover event. The principles of the invention are reflected in FIGS. 8-13. In FIGS. 8 and 9, the typical prior art situation is depicted in which the stable vehicle 10 in FIG. 8 is subjected to forces that tip the vehicle 10 about the pivot point 12 defined as the engagement of the outer edge of the tire with the surface of the ground G. When a line passing vertically through the center of gravity 11 is aligned with the pivot point 12, the vehicle 10 becomes unstable and will roll over on its side, as is depicted in FIG. 9. The maximum roll angle 13 is defined as the angle at which the vehicle 10 tilts relative to the normal position shown in FIG. 8. In the typical prior art situation, this maximum roll angle is normally in the range of 45-52 degrees, depending on the height and configuration of the vehicle 10.

Figure 10:
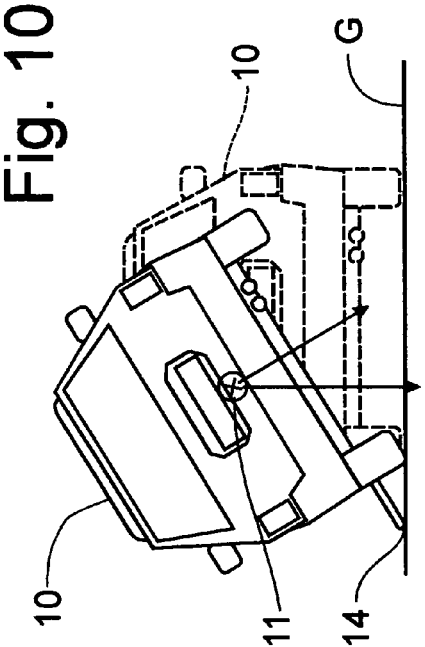
FIG. 10 is a diagrammatic rear elevational view of a vehicle having a deployable running board incorporating the principles of the instant invention, the running board being depicted in a laterally extended position and engaging the surface of the ground.
Figure 11:
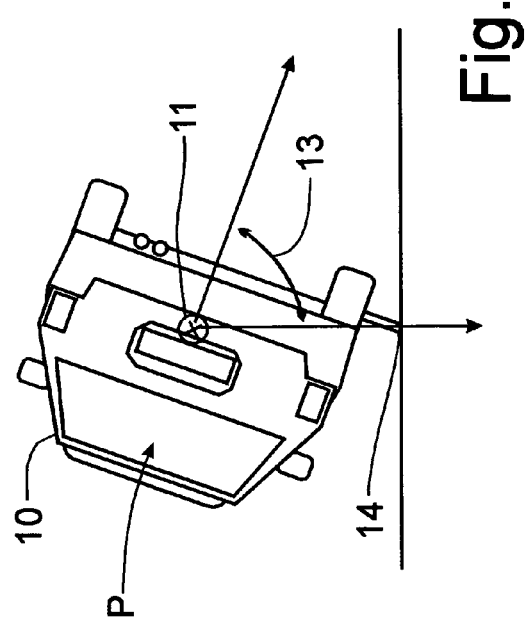
FIG. 11 is a diagrammatic rear elevational view of the vehicle depicted in FIG. 10 showing the maximum roll angle before the vehicle becomes unstable and rolls over.

In FIGS. 10 and 11, the running board 15 is extended laterally to change the position of the pivot point 14 laterally outwardly to be located where the extended running board 15 engages the surface of the ground G. As reflected in FIG. 11, the maximum roll angle 13 increases to approximately 70 degrees. Depending on the size and configuration of the vehicle 10, the running board 15 would engage the surface of the ground G to establish the pivot point 14 when the vehicle 10 tilts to an angle of about 30 degrees. Accordingly, the extended running board 15 increases the resistance of the vehicle 10 to a rollover event by increasing the maximum roll angle 13 at which the vehicle 10 loses stability.

A slightly different embodiment of the deployable running board 15 is reflected in FIGS. 12 and 13. In this embodiment, the running board is deployed outwardly and downwardly so that the extended running board 15 engages the ground G sooner than in the embodiment depicted in FIGS. 10 and 11 to establish the pivot point 14. As depicted in FIG. 12, the vehicle 10, depending on size and configuration, would engage the running board 15 into the ground G when the vehicle 10 has tilted approximately 17 degrees, as compared to approximately 30 degrees for the embodiment depicted in FIG. 10. Since the engagement of the running board 15 with the ground G also establishes a resistance to continued motion of the vehicle 10, i.e. the engaged running board 15 would tend to reduce the vehicle's velocity, yawing and sliding movement, the earlier engagement of the downwardly angled, extended running board 15 can help stabilize the vehicle 10 before reaching the maximum roll angle. With the pivot point 14 being slightly closer to the vehicle 10, given the same amount of movement of the running board 15, the maximum roll angle 13 is reduced to approximately 65 degrees; however, this maximum roll angle is still greater than is found in the typical prior art situation depicted in FIGS. 8 and 9.

The static stability factor (SSF) of a vehicle is computed by the dividing half of the vehicle's transverse width by the height of the center of gravity above the surface of the ground. Thus, SSF=T/2H. By extending the position of the pivot point 14 for the vehicle outboard of the tire, the effective transverse width of the vehicle is increased by the distance from the pivot point 12 at the outer edge of the tire to the pivot point 14 at the point of contact of the extended running board 15 with the ground G. Since the value of T is increased in the above formula, the value of effective SSF is similarly increased.

Referring now to FIGS. 1-7, the deployable running board 15 can best be seen. The running board 15 is supported from the frame of the vehicle 10 in a manner to allow the outward movement thereof. The running board 15 can have a fixed base member 16 and a movable member 18 mounted on the fixed base member and its support brackets, but movable relative thereto. The support of the movable member 18 on the fixed base member 16 allows the running board 15 to support a person getting in or out of the passenger compartment of the vehicle 10. The outer beam of the movable member 18 can be comprised of a sled runner type beam or individual pads attached to the outer end, 14 of the telescopic members 20. One skilled in the art will readily recognize that other support configurations for the running board 15 are possible to allow the function of support for ingress and egress for the vehicle, while allowing the running board 15 to be deployed laterally outwardly in the event of a rollover. A deployment apparatus 20 is attached to the movable member 18 of the running board 15 to affect the laterally outward movement thereof when a rollover event is sensed. An actuation mechanism 40 is operatively associated with the deployment apparatus 30 to cause the deployment of the movable member 16.

Figure 3:
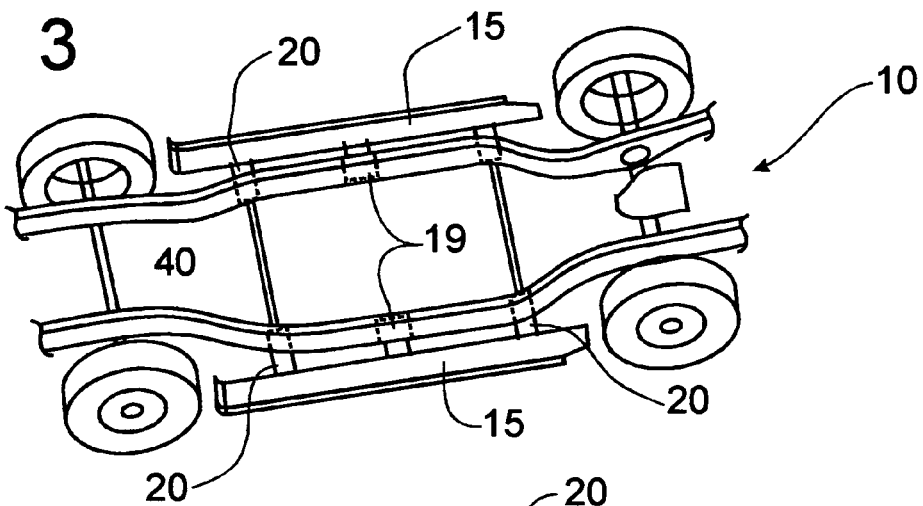
FIG. 3 is a schematic perspective view of the frame of the vehicle having a running board incorporating the principles of the instant invention supported thereon.
Figure 4:
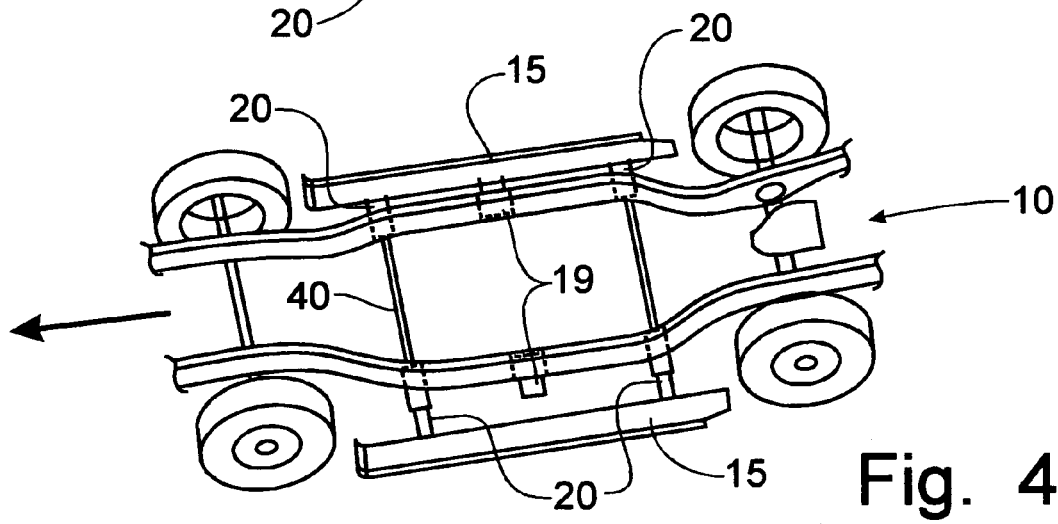
FIG. 4 is a schematic perspective view of the vehicle frame depicted in FIG. 3, but showing the relative extended position of a first embodiment of the laterally extendable running board mounted on the left side of the frame.
Figure 5:
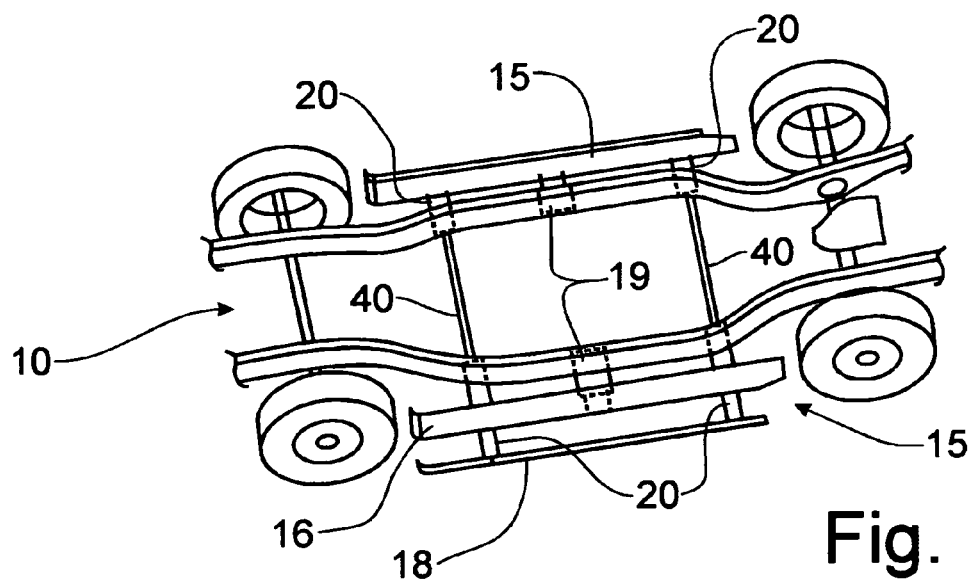
FIG. 5 is a schematic perspective view of the vehicle frame depicted in FIG. 3, but showing a second embodiment of the extendable running board, the left running board being shown in the extended position.

Different representative configurations of the running board 15 are shown in FIGS. 3-7. In FIGS. 3 and 4, a full sled type of running board 15 is shown in which the entire running board 15 is mounted on the deployment apparatus 20 and is extended outwardly thereby. A central support 19 may be required provide additional support for the running board 15. In FIG. 5, only the outer rail portion 18 of the running board 15 is laterally movable with respect to the inboard fixed portion 16. In FIGS. 6 and 7, the running board 15 is a rail-type of running board and is move easily movable in a lateral direction. This rail-type of running board 15 is particularly adaptable for use in the alternative configuration in which the running board 15 is moved outwardly and downwardly, as will be described in greater detail below.

The deployment apparatus 20 is best seen in FIGS. 14-17. Preferably, the deployment apparatus 20 is formed of a telescopic assembly that includes a base member 21 and an extendable activation member 22. Preferably, a spring 25 is compressed between the activation member 22 and the base member 21 to spring-load the activation member 22 for deployment. The shape of the deployment apparatus 20 can be cylindrical, rectangular, or any other shape conducive to telescopic movement. Anti-friction members 24, such as Teflon or polymer spacers, are optionally used between the base member 21 and the activation member 22 to facilitate the rapid telescopic extension of the activation member 22. A latching mechanism 30 is mounted at the end of the base member 21 to cause a release of the activation member 22 when a rollover event is sensed. The running board 15, or the extendable portion 18 thereof, is connected to the activation member 22 so as to be extendable therewith.

The latching mechanism 30 is mounted on the end of the base member 21 by axially extending mounts 26. The activation member 22 includes a pair of axially extending arms 23 that project through openings in the end plate 29 of the base member 21 to extend along the mounts 26 for engagement by the latching mechanism 30 through an opening 23a. The latching mechanism 30 is formed of a latch member 31 pivotally supported in each respective mount 26 and including a keeper member 32 positionable within the opening 23a. The keeper member 32 is formed with a cam surface 33 directed inwardly toward the center of the end plate 29 so that the force exerted by the spring 25 is operable to move the keeper member 32 out of the opening 23a when released. The distal end of the keeper member 32 is formed with a curved pocket 34 to receive the locking end 36 of the trip member 35.

Figure 16:
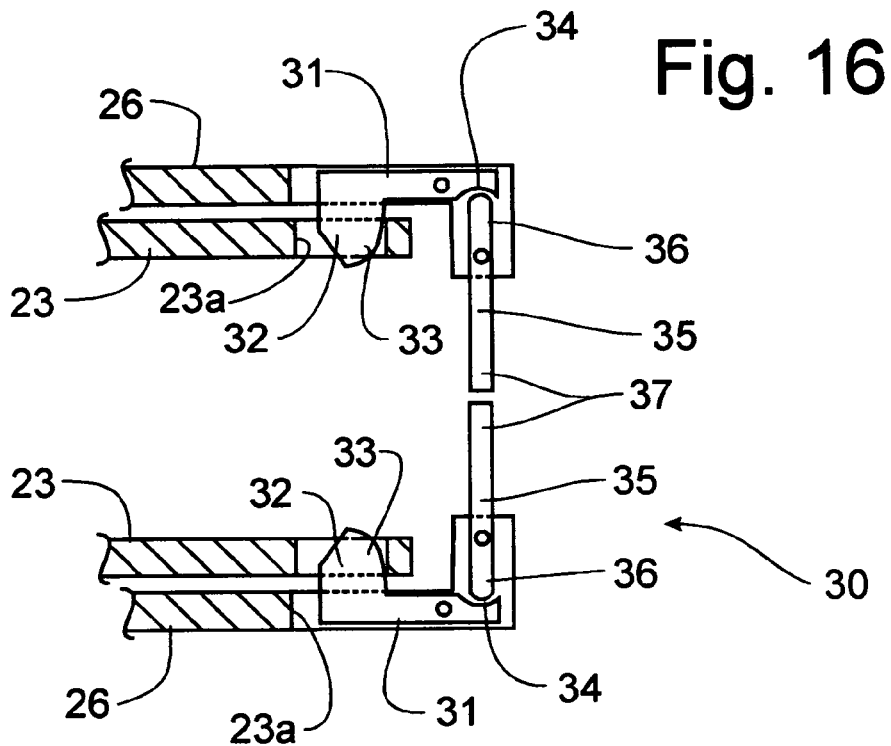
FIG. 16 is a partial cross-sectional view of the deployment apparatus depicting an elevational view of the latching mechanism in the latched position.

A trip member 35 is also pivotally supported in each respective mount 26 and is formed with a locking end 36 and a trip end 37 on opposing sides of the pivotal mount, with the trip end 37 being inboard of the locking end 36. The locking end 36 fits into the pocket 34 of the corresponding latch member 31. Since the spring force exerted on the keeper member 32 urges the latch member 31 outwardly out of the opening 23a in the arm 23, the pocket 34 is urged into engagement with the locking end 36 of the trip member 35 to freeze both the latch member 31 and the trip member 35 into a secured position, as is depicted in FIG. 16, with the trip ends 37 of the respective trip members 35 being oriented in general transverse alignment and in close proximity to one another. The spring force on the latch member 31 fixes the locking end 36 within the pocket 34 which prevents the latch member 31 from moving out of the opening 23a. With the keeper member 32 in interference with the arm 23, the activation member 22 is restrained in the retracted position, as depicted in FIG. 14.

Figure 1:
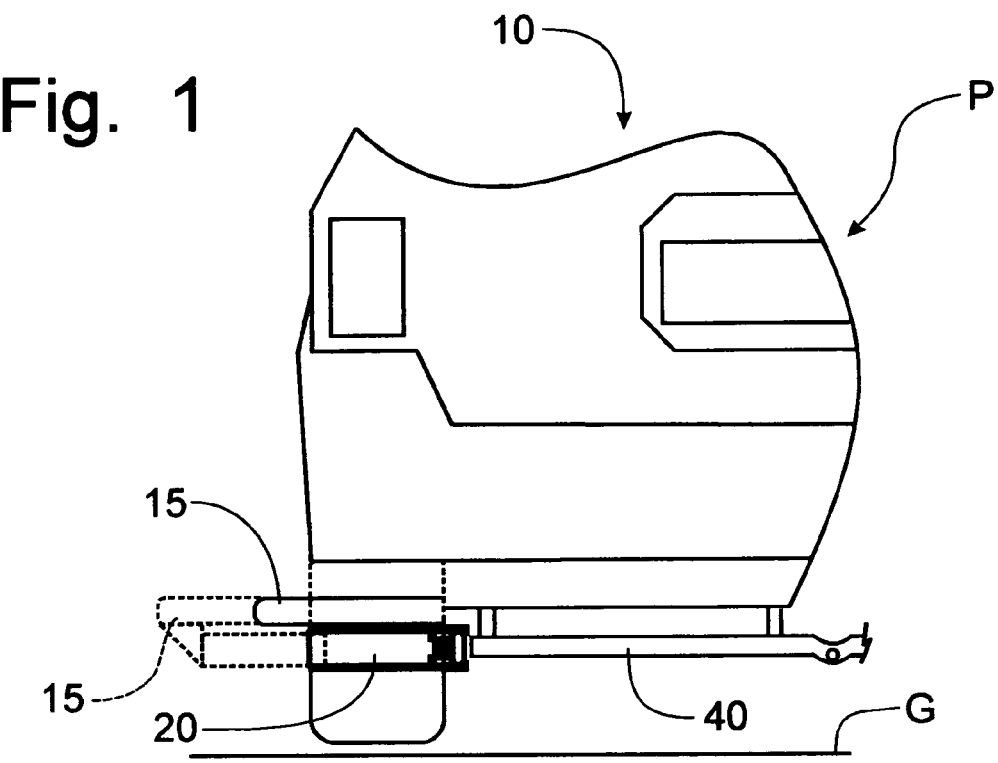
FIG. 1 is a partial rear elevational view of an automotive vehicle having a laterally extendable running board coupled to a deployment apparatus according to the principles of the instant invention, the rear tire being broken away to better view the apparatus located between the front and rear tires, the laterally extended position of the running board being shown in phantom.
Figure 17:
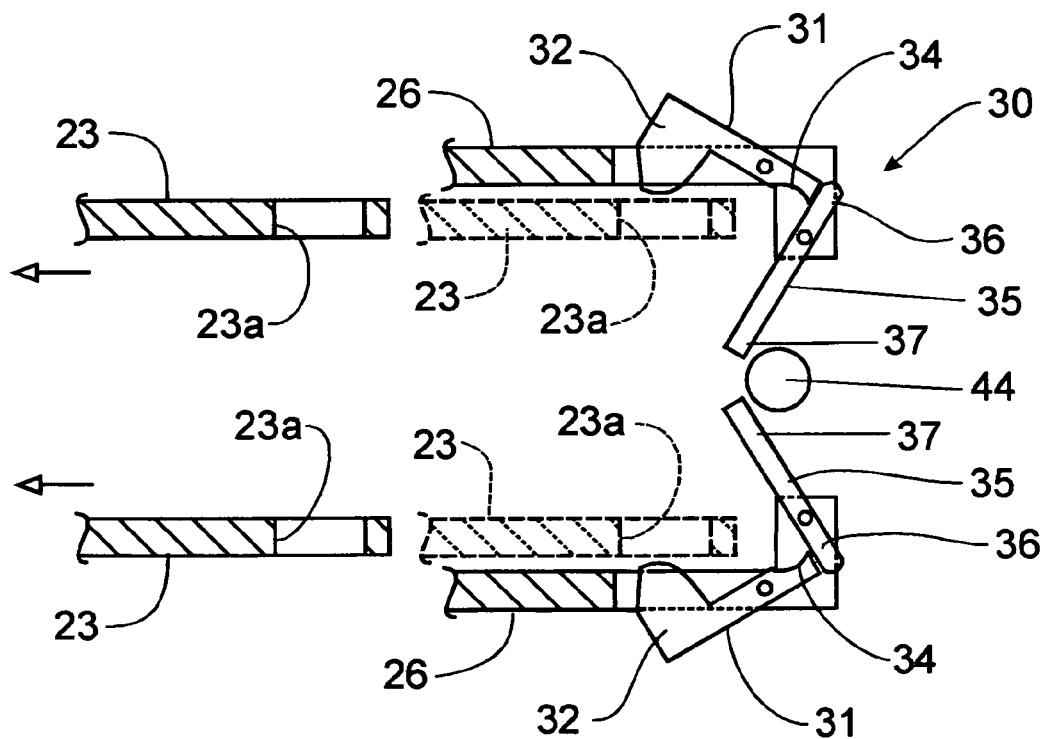
FIG. 17 is a partial cross-sectional view of the deployment apparatus depicting an elevational view of the latching mechanism in the release position, the latch members of the telescopic piston being shown as moving toward the extended position.

The latching mechanism 30 is actuated by an apparatus, such as a solenoid 39 connected to an electronic roll sensor 38, or other mechanical device 40, which will be described in greater detail below, to force a movement of the trip ends 37 of the trip members 35, as is depicted in FIGS. 15 and 17. The forced movement of the trip ends 37 results in a pivotal movement of the trip members 35 to move the locking ends 36 out of engagement with the corresponding pockets 34. Without the trip members 35 preventing the latch members 31 from pivotally moving, the force exerted on the keeper members 32 by the spring 25 on the cam surfaces 33 pops the keeper members 32 out of the openings 23a and frees the activation member 22 to extend outwardly from the base member 21. Because of the strength of the spring 25, the telescopic projection of the activation member 22 is fairly rapid. With the running board 15 connected to the activation members 22, the extension of the activation members 22 results in a lateral movement of the running board 15 connected thereto, as is depicted in FIGS. 1 and 2 in phantom.

One skilled in the art will recognize that the latching mechanism 30 can also be formed with a single latch member (not shown) on each respective mount 26 without a separate trip arm. In such a configuration, the latch members could be restrained in the locking position by a solenoid, or other device that can be energized by a sensor to cause the latch members (not shown) to pivot outwardly to affect release of the activation member 22.

To prevent the activation member 22 from completely separating from the base member 21, the deployment apparatus 20 also incorporates a stop mechanism 45, best seen in FIGS. 14, 15 and 20, that prevents the separation of the activation member 22. Preferably, the stop member 45 is a spring-loaded pin 46 retained within a housing 47 capturing a spring 48 to extend the pin 46 through a hole 49 in the base member 21 when the pin 46 becomes aligned therewith upon extension of the activation member 22 from the base member 21. The housing 47 could be carried by the base member 21 on the outside surface thereof so that the spring-loaded pin 46 extends through an opening (not shown) formed in the activation member 22. However, because of the desire to provide a deployment apparatus 20 that can be reset, as is described in greater detail below, the housing is better positioned internally of the activation member 22.

Figure 2:
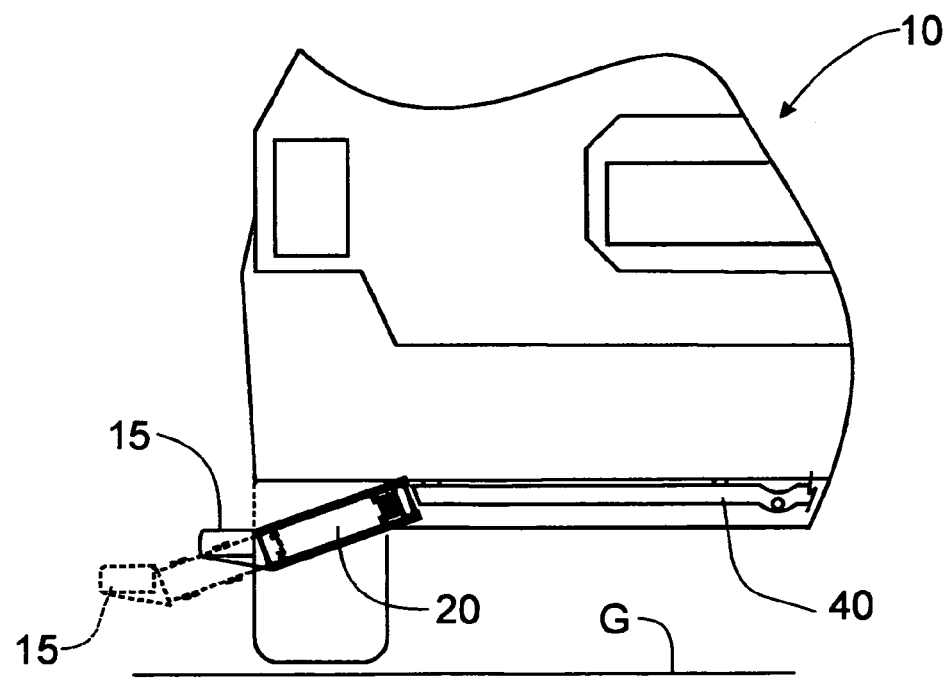
FIG. 2 is a partial rear elevational view of an automotive vehicle having a second embodiment of an extendable running board incorporating the principles of the instant invention, the laterally extended position of the running board being shown in phantom.

An alternative orientation of the deployment apparatus 20 is depicted best in FIG. 2 and represented in FIGS. 12 and 13. Instead of mounting the deployment apparatus 20 in a horizontal orientation, as is depicted in FIG. 1, for example, the deployment apparatus 20 is positioned at an angle to horizontal so that the extension of the activation member 22 will be outwardly and downwardly toward the ground. As is noted above with respect to FIGS. 12 and 13, this angular orientation of the deployment apparatus 20 places the pivot point 14 a little closer to the vehicle 10 than the horizontal orientation would create, but still increases the effective transverse width of the vehicle 10 and the corresponding SSF value. The primary benefit of the angular acceleration is that the tipping points 14 will touch the ground earlier than a horizontally placed equal length deployment apparatus, resulting in asserting an early counter balancing force to prevent complete rollover. One skilled in the art will recognize that the sloped or angular orientation of the deployment apparatus 20 can reduce the length of the deployment apparatus 20 as the amount of movement toward the ground G would preferably be less than needed for a horizontal extension of the running board 15.

Preferably, each running board 15 would be attached to a pair of deployment apparatus 20 spaced fore-and-aft on the running board 15. Extension of the running board 15 would require activation of both deployment apparatuses 20. The running board 15 on both sides of the vehicle 10 would be similarly equipped. While the sensor 38 can be operable to activate only the running board on the low side of the vehicle, sometimes the vehicle will bounce back to roll over the other side, which could happen during certain maneuvers, whereupon the sensor 38 will then activate the deployment apparatus 20 on the opposite side of the vehicle 10 to extend that running board 15 as well.

Once activated, the mechanically operable deployment apparatus 20 can be reset, provided that the components thereof have not been damaged in a manner that would prevent the resetting and subsequent operation of the deployment apparatus 20 in a proper manner. To reset the deployment apparatus, the pin 46 is pushed back into the housing 47 while the activation member 22 is slightly retracted into the base member 21 against the spring 25 so that the spring-loaded pin 46, which preferably is provided with a ball at the tip thereof to facilitate movement thereof along the base member 21, will ride on the interior surface of the base member 21 until becoming aligned with the opening 49. The activation member 22 is then pushed completely back into the base member 21 until the arms 23 extend through the openings in the end plate 29 of the base member 21 such that the keeper members 32 are aligned with the openings 23a. While restraining the activation member 22 against the spring 25, the latching mechanism 30 is reset by pushing the keeper member 32 into the opening 23a and the trip members are re-aligned so that the locking ends 46 are positioned in the pockets 34 of the latch members 31. The deployment apparatus is then reset for subsequent deployment as described above.

Referring now to FIGS. 1, 2, 18 and 19, an actuation mechanism 40 is shown to provide a simple mechanical sensing and actuation operation based on inertia for use with the deployment apparatus 20. The actuation mechanism includes a transversely extending tube 41 that extends from a contiguous location at one deployment apparatus 20 on one side of the vehicle 10 to the deployment apparatus 20 on the opposing side of the vehicle 10. Midway between the two opposing deployment apparatuses 20, the tube 41 is formed with a cup 42 that houses a ball 44. The cup 42 is shaped to retain the ball 44 unless the vehicle 10 tilts to a pre-selected roll angle, as represented in FIG. 19, whereupon the ball is released from the cup 42 and rolls by gravity down the inclined tube 42 until the ball 44 strikes the trip ends 37 of the trip members 35 causing the trip members 35 to pivot and release the latch members 31. The ball 44 has been found to be of sufficient size and weight to affect a pivoting of the trip members 35 when the ball is formed of steel and has a diameter of one-half inch. Accordingly, the tube 41 and the cup 42 would require a configuration to match the size and shape of the ball 44 to permit a free movement thereof.

Figure 21:
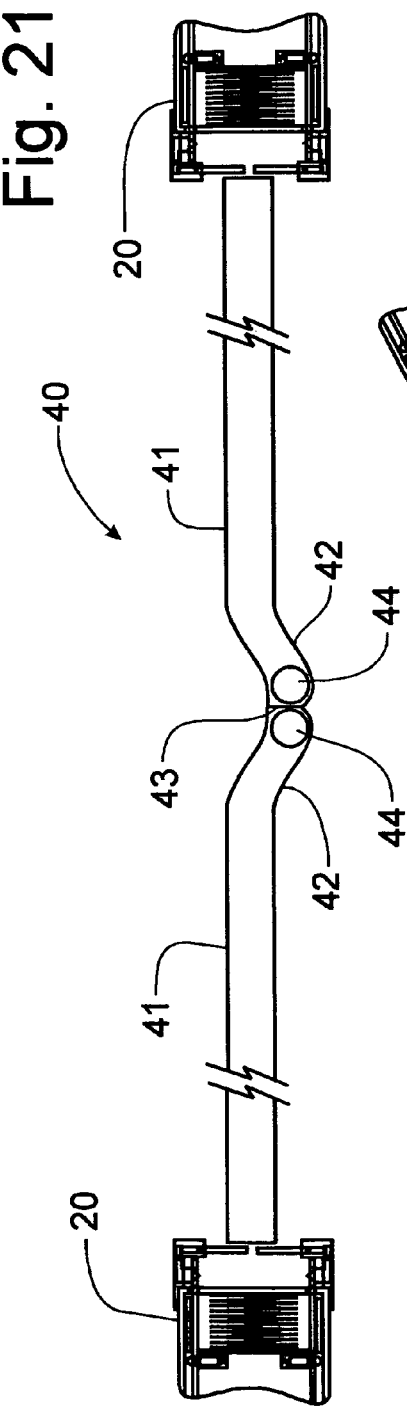
FIG. 21 is an enlarged partial cross-sectional view of an alternative embodiment of the mechanical actuation mechanism, portions of the transversely extending tubes being deleted for purposes of clarity, the end portions of the deployment apparatuses being broken away.
Figure 22:
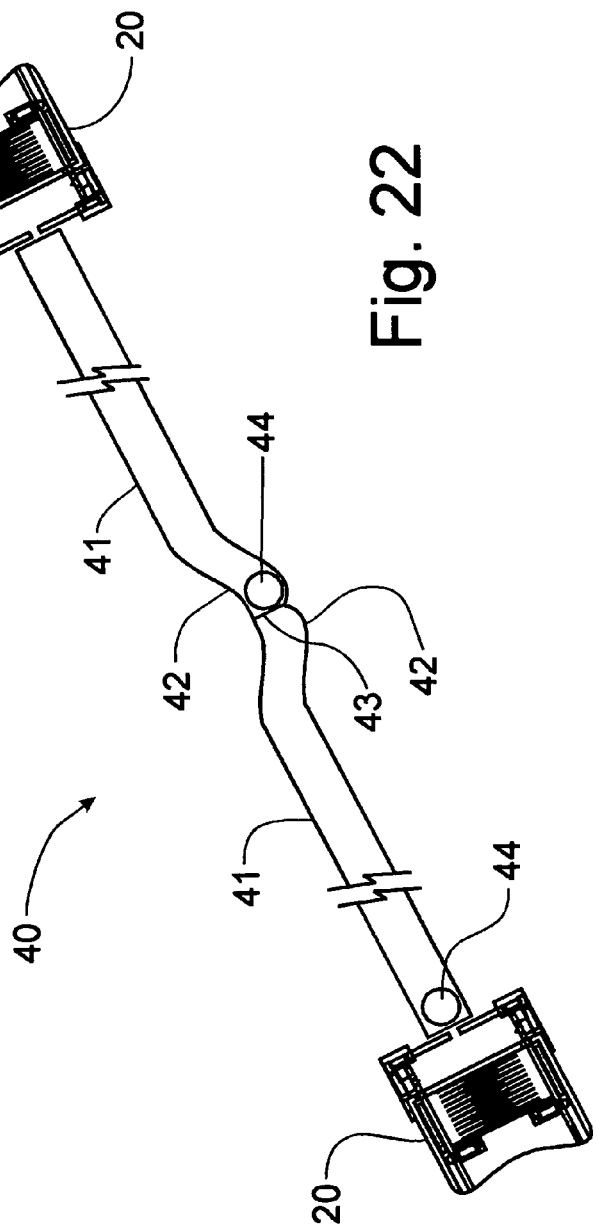
FIG. 22 is an enlarged partial cross-sectional view of the actuation mechanism of FIG. 21, but depicted in a tilted orientation that releases one of the balls into engagement with the corresponding deployment apparatus.

Referring now to FIGS. 21 and 22, an alternative embodiment of the actuation mechanism 40 can best been seen. The configuration is generally the same as depicted in FIGS. 18 and 19, but the cup 42 is divided at the middle with a partition 43 creating two cup segments. A ball 44 is placed into each cup segment to move toward a corresponding deployment apparatus 20 when the vehicle rolls beyond a minimum roll angle, as is described in greater detail above. With two balls 44 separated by the partition 43, the actuation mechanism 40 can operate more effectively if the vehicle starts to roll over in one direction and then bounces back to start to roll over in the opposite direction, which requires the deployment of the running boards 15 on both sides of the vehicle 10.

Figure 23:
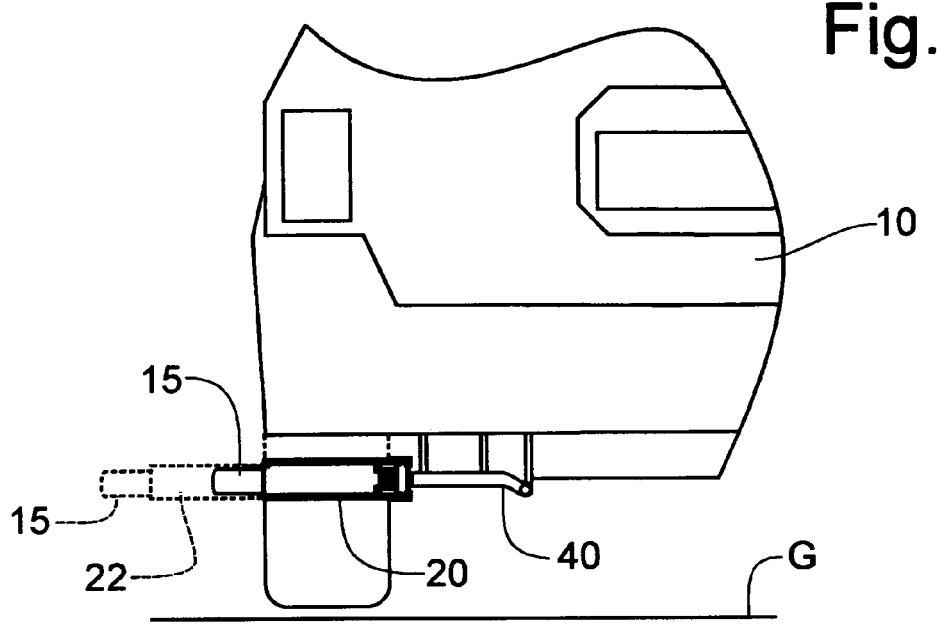
FIG. 23 is a partial rear elevational view of an automobile similar to that of FIG. 1, but showing an elevational view of a third embodiment of the mechanical actuation mechanism.
Figure 24:
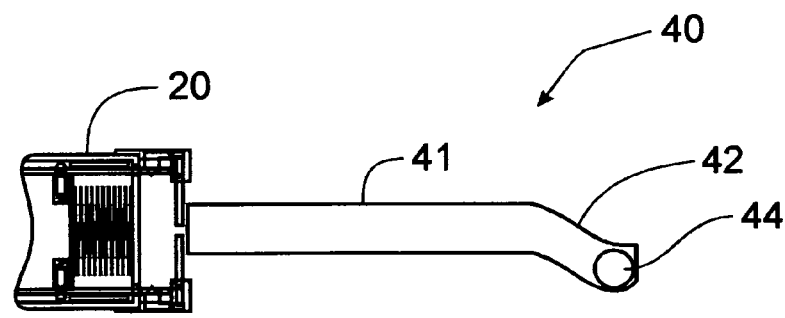
FIG. 24 is an enlarged cross-sectional view of the third embodiment of the actuation mechanism with the end portion of the deployment apparatus being broken away.
Figure 25:
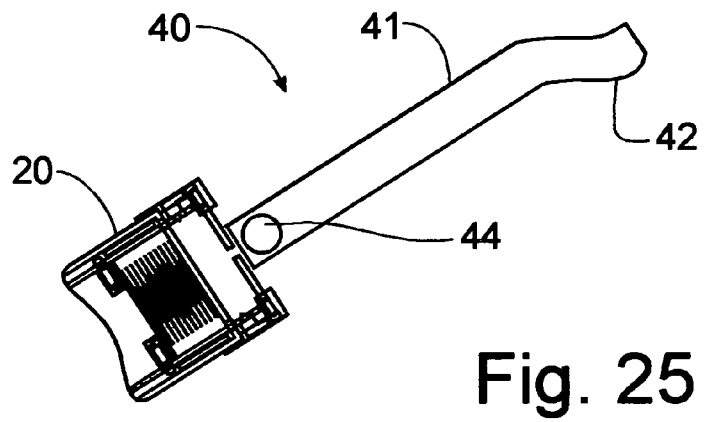
FIG. 25 is an enlarged cross-sectional view of the actuation mechanism depicted in FIG. 24, but titled to release the ball into engagement with the deployment apparatus.

As is depicted in FIGS. 23-25, the actuation mechanism 40 could be formed alternatively with the cup 42 located at an inboard end of one of the tubes 41 with the ball 44 disposed within the cup 42 to be released therefrom and roll through the tube 41 into engagement with the latching mechanism 30 whenever the vehicle 10 tilts to a pre-established roll angle to affect the release of the ball 44 from the cup 42. By placing one such actuation mechanism 40 adjacent each respective deployment apparatus 20 on the opposing laterally spaced sides of the vehicle 10, the deployment apparatus 20 will only be actuated when the vehicle 10 tilts through the minimum required roll angle with the corresponding deployment apparatus 20 being at the low side of the vehicle 10, so that the ball 44 rolls by the force of gravity into the latching mechanism 30 associated with that corresponding deployment apparatus 20, as is described in greater detail above.

In operation, the vehicle 10 begins to incur a roll over event, tipping to one side as is represented in FIG. 10. Once the vehicle 10 has reached a roll angle sufficient to dislodge the ball 44 from the cup 42, the ball 44 rolls at the speed induced by gravity to the deployment apparatus 20 on the lower side of the vehicle 10 until impacting the trip members 35. The pivotal movement of the trip members 35 releases the latch members 31 allowing the activation member 22 to extend telescopically from the base member 21 until stopped by the spring-loaded stop members 45 interengaging the activation and base members 22, 21. Once the activation members 22 are extended, the running board 15 is moved laterally outwardly by virtue of the connection thereof with the outboard ends of the activation members 22.

Once extended and engaged with the surface of the ground G, the running boards 15 serve to retard the forward velocity of the vehicle 10 and restrict any yawing and sliding movement of the vehicle 10. Depending on the severity of the forces associated with the rollover event being incurred, the engagement of the extended running board 15 with the ground might be satisfactory to halt some rollover motion of the vehicle 10. In the event the vehicle 10 continues to roll over, the point of engagement of the running board 15 with the ground G creates a pivot point 14 that is outboard of the tires and, thus, enables the vehicle 10 to continue through a roll angle that is greater than the maximum roll angle associated with a pivot point at the tire, before becoming unstable and rolling onto the side of the vehicle 10.

It will be understood that changes in the details, materials, steps and arrangements of parts which have been described and illustrated to explain the nature of the invention will occur

Having thus described the invention, what is claimed is:

1. An automotive vehicle, comprising:
a frame supported over the surface of the ground by wheels, the frame having laterally opposing sides;
a passenger compartment supported on the frame;
a running board supported from the frame at each opposing side thereof to assist with ingress and egress of the passenger compartment;
a deployment apparatus mounted on the frame and connected to each respective running board to extend the running board outwardly from the frame; and
a mechanical actuation mechanism supported from the frame adjacent each respective deployment apparatus and including a ball that engages the deployment apparatus to actuate the deployment apparatus to extend the running board in response to the vehicle incurring a rollover event with the corresponding deployment apparatus at a low side of the vehicle.

2. The automotive vehicle of claim 1 wherein the mechanical actuation mechanism includes a tube coupled to a cup and positioned with a discharge end of the tube being positioned adjacent the respective deployment apparatus, said ball being retained within the cup until the vehicle attains a minimum roll angle.

3. The automotive vehicle of claim 2 wherein the cup is positioned along a longitudinally extending centerline of the vehicle, the cup being coupled to a pair of transversely extending tubes terminating at respective deployment apparatuses located on opposing sides of the vehicle.

4. The automotive vehicle of claim 3 wherein each deployment apparatus includes a trip member positioned for engagement with the ball when discharged from the corresponding tube, the trip member actuating the corresponding deployment apparatus when engaged by the ball.

5. The automotive vehicle of claim 4 wherein the deployment apparatus includes a base member supported on the frame and a telescopic piston extendable from the base member, the extension of the telescopic piston from the base member being controlled by a latch member operatively associated with the trip member.

6. The automotive vehicle of claim 5 wherein the cup is configured to retain the ball within the cup until tilted to a predetermined angle at which point the ball will roll down the tube to engage the trip member positioned vertically below the cup.

7. The automotive vehicle of claim 6 wherein the cup is divided into two segments with a corresponding ball being located within each segment.

8. An inertia-based actuation mechanism for activating a deployment apparatus on an automotive vehicle, comprising:
a cup member operable to retain a ball within the cup until the cup has been tilted to a predetermined angle; and
a tube coupled to the cup to receive the ball from the cup and direct the ball into engagement with the deployment apparatus, the deployment apparatus including a trip member positioned at a discharge end of the tube for engagement with the ball.

9. The actuation mechanism of claim 8 wherein the automotive vehicle has a deployment apparatus positioned on each opposing lateral side thereof, each deployment apparatus having a tube positioned to discharge the ball into the corresponding trip member.

10. The actuation mechanism of claim 9 wherein one cup retaining the ball and coupled with one tube is oriented for discharge of the ball into engagement with the trip member of each respective deployment apparatus.

11. The actuation mechanism of claim 9 wherein two laterally opposing deployment apparatuses are associated with one cup having the ball retained therein and being coupled to tubes extending in opposing lateral directions to the respective opposing deployment apparatus.

12. The actuation mechanism of claim 11 wherein the cup is separated into two laterally opposing segments, each said segment having one ball retained therein for discharge to the corresponding deployment apparatus.

13. The actuation mechanism of claim 11 wherein each deployment apparatus includes a base member having a telescopic piston slidably mounted therein, the movement of the telescopic piston being controlled by a latch member operably connected to the trip member such that the engagement of the trip member by the ball affects a release of the latch member to permit the extension of the telescopic piston from the base member.

14. A method of deploying a running board on an automotive vehicle from a normal position to a laterally extended position, comprising the steps of:
mounting the running board to a deployment apparatus having a fixed base member and a telescopic piston extendable from the base member, the telescopic piston being retained in a retracted position within the base member by a latching mechanism, the piston being connected to the running board such that an extension of the telescopic piston from the base member causes the running board to move from the normal position to the laterally extended position;
positioning a ball within a cup member oriented to retain the ball within the cup until the cup is tilted to a predetermined angle;
coupling a tube to the cup to receive the ball therefrom and direct the ball to the deployment apparatus for engagement with a trip member supported on the deployment apparatus; and
pivoting the trip member upon engagement therewith by the ball to release the latching mechanism and allow the telescopic piston to extend from the base member.

15. The method of claim 14 wherein the vehicle has a running board mounted on laterally opposing sides of the vehicle, each of the running boards being coupled to respective deployment apparatuses, the positioning step providing a separate cup, ball and tube for each respective deployment apparatus.

16. The method of claim 14 wherein the vehicle has a running board mounted on laterally opposing sides of the vehicle, each of the running boards being coupled to respective deployment apparatuses, the positioning step locating the cup along a longitudinal centerline of the vehicle, the coupling step placing a tube on opposing sides of the cup to direct the ball to the corresponding deployment apparatus.

17. The method of claim 16 wherein the positioning step includes the steps of:
dividing the cup into two laterally opposing segments; and
placing one ball into each segment to be discharged into the corresponding tube when the cup has been titled to the predetermined angle and the corresponding deployment apparatus is located vertically below the cup.

18. The method of claim 14 wherein the latching mechanism has a pivoted latch member, the pivoting step including the steps of:
disengaging a locking end of the trip member from a pocket formed in the latch member; and
releasing the latch member for pivotal movement to permit the extension of the telescopic piston.

19. The method of claim 18 wherein the vehicle has a running board mounted on laterally opposing sides of the vehicle, each of the running boards being coupled to a pair of longitudinally spaced deployment apparatuses, the pivoting step being required for both of the longitudinally spaced deployment apparatuses before the corresponding running board can be moved from the normal to the laterally extended position.

20. The method of claim 19 wherein the running board can be returned to the normal position after being laterally extended by the following steps:
pushing the telescopic pistons on both deployment apparatuses back to the retracted position;
while restraining the telescopic pistons in their retracted positions, resetting the respective latching mechanisms to restrain the telescopic pistons in the retracted positions;
re-engaging the locking end of the respective trip members into the pocket of the corresponding latch member; and
replacing the ball into the cup for subsequent discharge from the cup.

\* \* \* \* \*